July 3, 1951   O. S. FIELD ET AL   2,559,415
COURSE INDICATING LIGHT BEACON
Filed Nov. 23, 1948   3 Sheets-Sheet 1
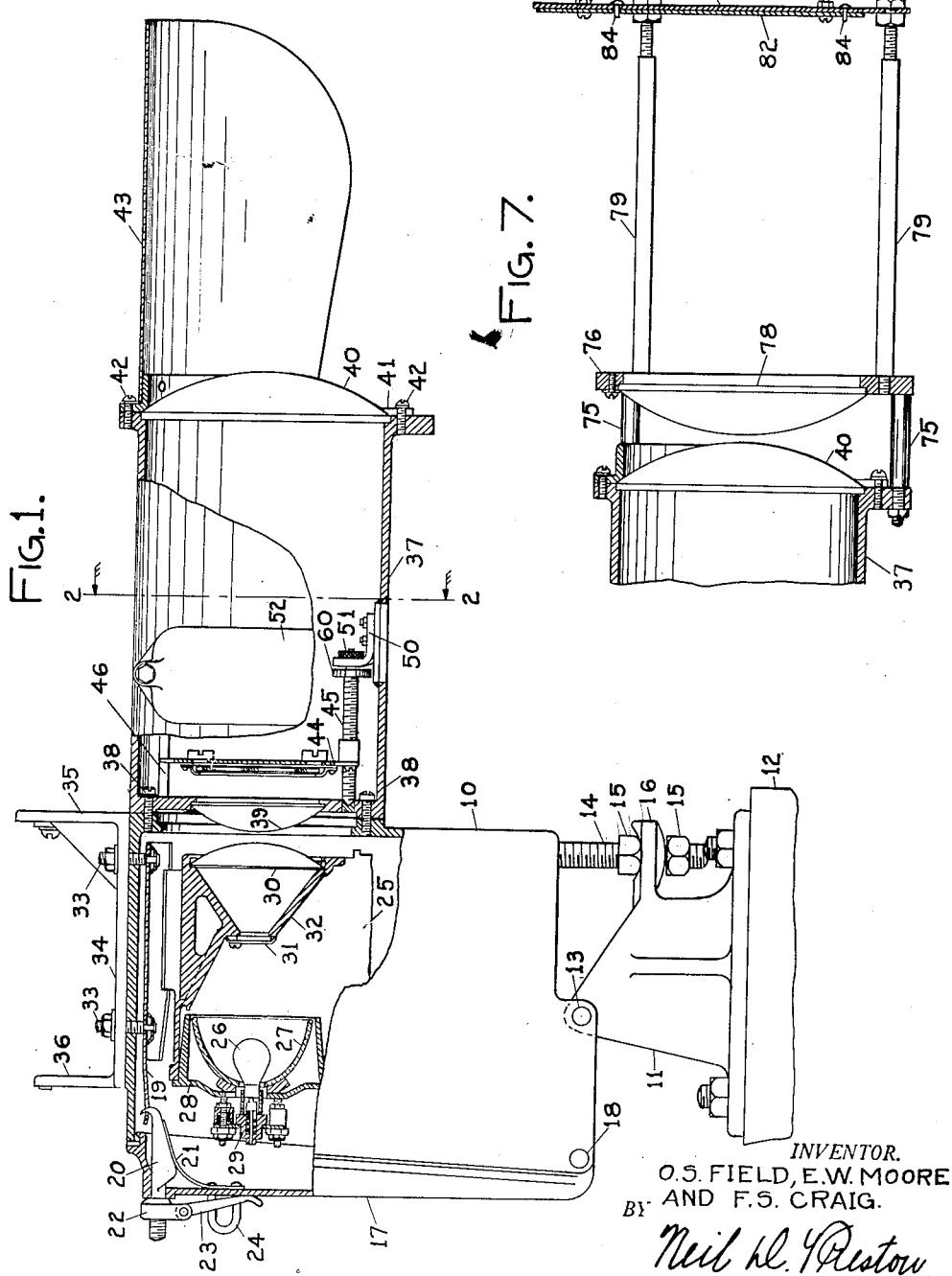
INVENTOR.
O.S. FIELD, E.W. MOORE
AND F.S. CRAIG.
BY Neil W. Preston,
THEIR ATTORNEY.

July 3, 1951  O. S. FIELD ET AL  2,559,415
COURSE INDICATING LIGHT BEACON
Filed Nov. 23, 1948  3 Sheets-Sheet 2
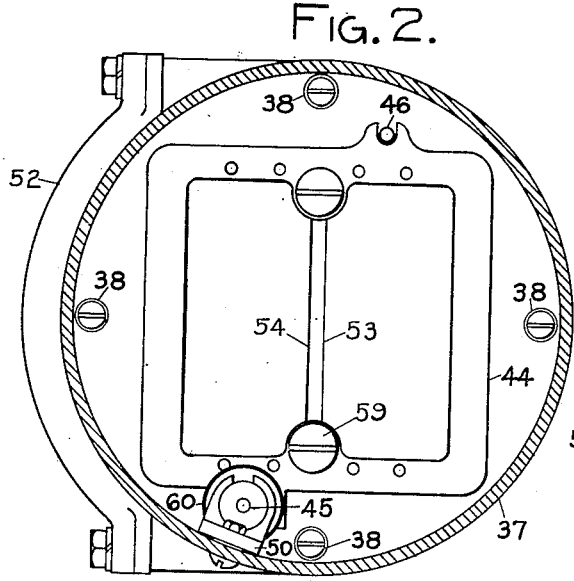
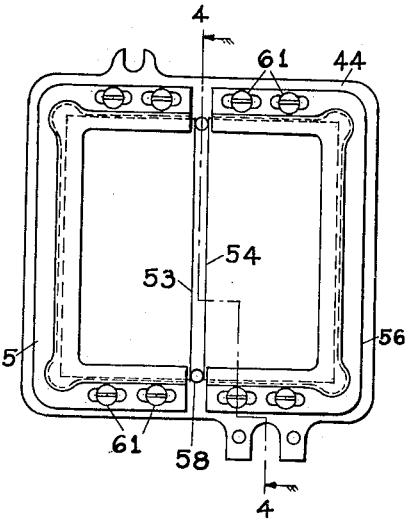
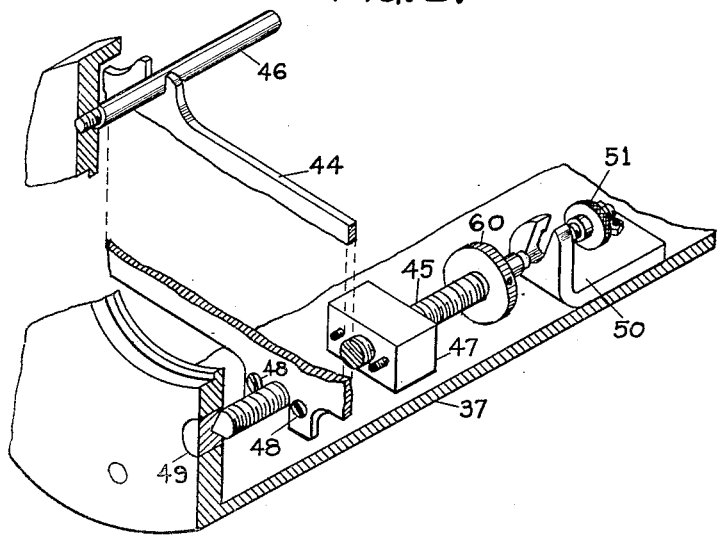
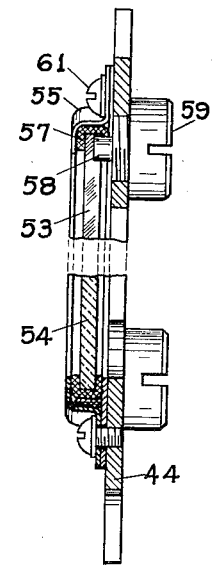
INVENTOR.
O.S. FIELD, E.W. MOORE
BY AND F.S. CRAIG.
Neil W. Preston
THEIR ATTORNEY.

July 3, 1951 O. S. FIELD ET AL 2,559,415
COURSE INDICATING LIGHT BEACON
Filed Nov. 23, 1948 3 Sheets-Sheet 3
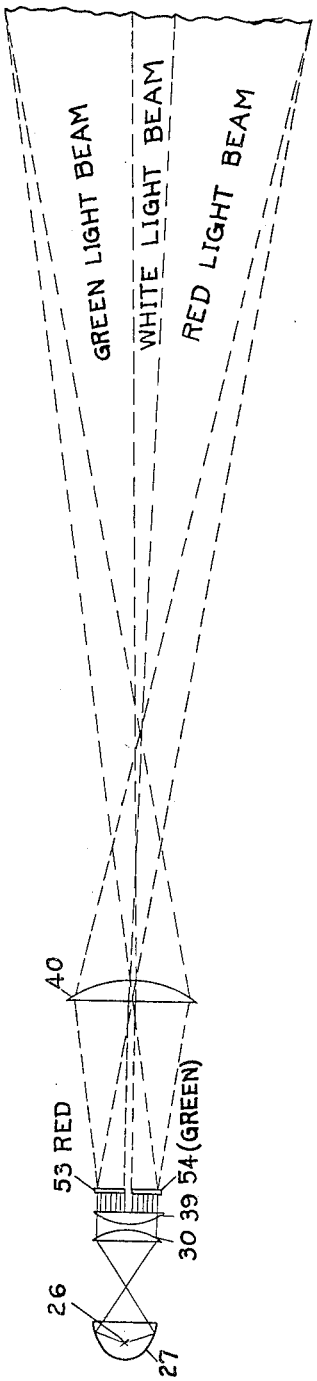
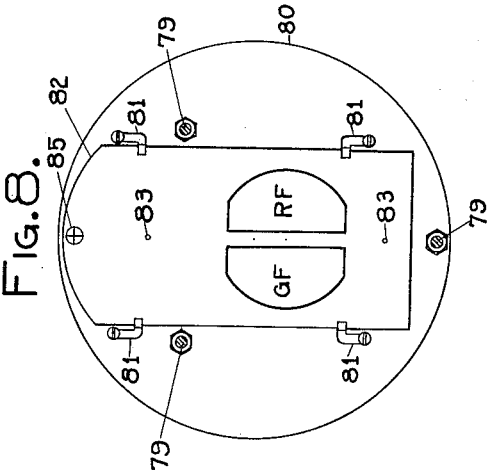
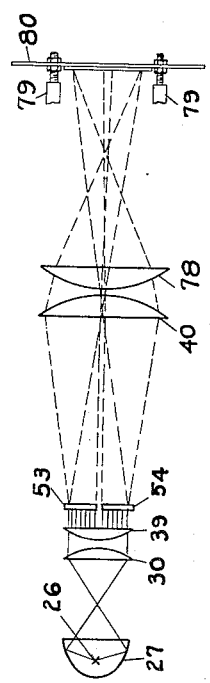
INVENTOR.
O. S. FIELD, E. W. MOORE
AND F. S. CRAIG.
BY Neil W. Preston,
THEIR ATTORNEY Patented July 3, 1951

2,559,415

UNITED STATES PATENT OFFICE 2,559,415

COURSE INDICATING LIGHT BEACON

Oscar S. Field and Edmund W. Moore, Rochester, and Frank S. Craig, Chili, N. Y., assignors to General Railway Signal Company, Rochester, N. Y.

Application November 23, 1948, Serial No. 61,642

5 Claims. (Cl. 177—352)

1

This invention relates to light signals of the searchlight type, and more particularly pertains to a beacon signal emitting a polychrome light beam particularly adapted for the guidance of aircraft and water surface craft.

In the guiding of aircraft for landing purposes and the guiding of watercraft through channels and the like, it has been found desirable to employ a tri-color light beam with the central beam being of a distinctive color to define the desired or proper course to be followed. In most prior art organizations provided to accomplish this purpose, a multiplicity of different projectors are required; and in those cases where a single projecting unit is employed, the possible color combinations are limited and the boundary lines between the differently colored beams defining the course are not distinctive.

In view of the above considerations, one object of the present invention is to provide a polychrome projector having a single light source and yet providing sharp and distinct boundary lines between the different colors of the projected beam.

Another object of the present invention resides in the provision of a polychrome projector having a single light source in which any desired combination of color beams may be obtained.

A further object of the present invention resides in the provision of a polychrome projecting unit in which various adjustments are readily made both for adapting the projector to the particular guidance problem for which it is to be used and also to provide proper adjustment upon the replacement of burned out bulbs and the like without requiring actual observation tests throughout the range of the projected beam.

Other objects, purposes and characteristic features of the present invention will be in part obvious from the accompanying drawings, and in part pointed out as the description of the invention progresses.

In describing the invention in detail, reference will be made to the accompanying drawings, in which like reference characters designate corresponding parts throughout the several views, and in which:

Fig. 1 is a side elevational view of a searchlight type beacon constructed to project a tri-color light beam, with certain parts shown in section to clarify its structure;

Fig. 2 is a sectional view of a portion of the light projecting signal shown in Fig. 1 and taken upon lines 2—2 of that figure looking in the direction of the arrows;

Fig. 3 is a front view of the movable color screen employed in the signal of Fig. 1 with the related parts of the signal omitted;

Fig. 4 is a side sectional view of the color screen shown in Fig. 3 and taken on lines 4—4 of that figure looking in the direction of the arrows;

Fig. 5 is a sectional perspective view of the color screen adjusting mechanism shown in Fig. 1;

Fig. 6 is a diagrammatic illustration of the projected light beams provided by the signal structure shown in Fig. 1;

Fig. 7 is a side view of the focus testing device adapted to be used with the signal structure shown in Fig. 1;

Fig. 8 is a front view of the mounting screen and projected field template forming a part of the focus testing device shown in Fig. 7; and Fig. 9 is a diagrammatic illustration of the projected light rays provided by the signal structure of Fig. 1 when the focus testing device of Fig. 7 is employed.

While the present invention is applicable to, and usable for, any type of range or course delineating system, the embodiment of the present invention has been more particularly adapted for use as a polychrome beacon signal to be used for guiding watercraft. It should also be understood that with minor adjustments it may also be used for guiding landing aircraft. Thus, the particular structure shown and its functional characteristics described should be considered as applicable to different uses and purposes within the contemplated scope of the invention.

Referring to Fig. 1, the beacon signal is shown as comprising a signal housing 10 pivotally mounted on a base support 11 that is firmly secured to a suitable foundation 12. The signal casing 10 is held in position on its base 11 by a suitable pivot 13 and an adjusting bolt 14 having lock nuts 15 on each side of a projecting arm 16 connected to the base plate 11.

The signal casing 10 is enclosed by a suitable cover 17 which is pivoted at 18 but is held in a tightly closed position by a latch mechanism including a spring holder 19, a latch or locking dog 20, a biasing spring 21, a hasp nut 22, a hasp 23, and a staple 24. The latch 20 can be released by using the hasp as a lever to unscrew the hasp nut 22 and then forcing the extended threaded portion of the locking dog 20 upwardly to cause its hooked end to disengage the spring holder 19.

The spring holder 19 is so formed as to provide two opposing guide rails to engage finger portions of the inner projection unit 25. This inner projection unit 25 can thus be moved into position while the cover 17 is opened or moved out for repair and replacement as required. Such inner projecting unit 25 includes a casing 25 which supports a light unit having an incandescent bulb 26, a reflector 27, and an outer holder 28. The lamp 26 is mounted in a suitable spring biased socket 29 which provides for adjusting the location of the lamp 26 within the reflector. This spring biased holder or socket 29 includes suitable wire connections for furnishing power to the lamp 26. The inner projecting unit 25 also includes the condensing lens 30 suitably held in position by a spring gasket. The light from the incandescent lamp 26 is focused by the elliptical reflector 27 so as to pass through the opening in the small end of a cone shaped chamber 32 leading to the lens 30. A suitable plain glass cover 31 is attached to this cone shaped chamber 32 to keep out any dust while the unit 28 is removed. The inner surface of the cone 32 is roughened and made dark to prevent reflections.

Additional space is provided in the casing 10 beneath the inner light unit 25 for housing control apparatus such as relays or the like, in connection with governing the energization of the incandescent lamp 26.

The same bolts 33 which fasten the spring holder 19 with its guiding rails, also secure in position a sighting unit 34. This sighting unit has a forward member 35 and a rearward member 36 the former member 35 having a cross-hair type sight and the latter member 36 having a pin-hole type sight. This sighting device 34 can thus be used to locate the center of the projected beam upon any desired distant point in the usual conventional way.

A lens and color filter housing member 37 of generally tubular shape is attached to the main casing 10 by threaded bolts 38 to make a tight connection between the housing member 37 and the casing 10. This tubular housing member 37 includes another condensing lens 39 adjacent to the condensing lens 30, and also includes an objective lens 40 held in position by a suitable ring 41 attached by threaded bolts 42. A hood 43 is attached to the ring 41 by suitable screws. Located within the beam projecting device 37 is a movable color screen mounting 44 which can be moved horizontally along the axis of the projected beam by reason of a suitable threaded adjusting rod 45 and a guide rod 46. This adjusting portion of the structure can best be seen in Fig. 5 where the movable color screen mounting 44 is shown to have an open U-shaped portion for fitting around the guide rod 46 and another for fitting around the adjusting rod 45. But coinciding with this latter U-shaped extension is a threaded member 47 attached to the color screen 44 by threaded screws 48. This rectangular shaped member 47 is threaded so as to receive the threaded adjusting rod 45 and to be moved horizontally as the adjusting rod 45 is rotated. This adjusting rod 45 is pivoted at one extreme end by having a bearing insert 49 pressed into the casing of the member 37, and is mounted at the other end by an L-shaped support 50 also bolted to the casing 37. The threaded adjusting rod 45 is kept from end-wise movement by reason of the thumb nut 60 being pinned or soldered thereto and having an extending shoulder making abutment with the L-shaped member 50 as can best be seen in Fig. 1. The adjusting rod 45 is held in its last rotated position by the frictional contact provided when lock nut 51 is tightly threaded against the support member 50.

Access is provided to the movable color screen mounting 44 and its associated adjustment just described by a suitable opening in the tubular housing 37 having a removable cover 52 as seen in Figs. 1 and 2.

The movable color screen mounting 44 is shown in Fig. 2 as being generally square and located centrally within the casing 37. The structure of this color screen mounting 44 and the attachment of the filters is shown in detail in Figs. 3 and 4 where it can be seen that it comprises an outer ring portion that has the U-shaped projections previously mentioned for its support on the adjusting rod 45 and the guiding rod 46. This outer ring or frame portion has two rectangular color screens mounted thereon, such as red and green color screens or filters 53 and 54 respectively, which are held in position by reason of individual gasket holding members 55 and 56 which are provided with slotted portions through which large-headed screws 61 may be secured into the mounting member 44. Beneath these members 55 and 56 are suitable gasket portions 57 and the color filters 53 and 54. The gaskets 57 are U-shaped to fit around three sides of their respective filters 53 and 54, and are also grooved as can be seen in Fig. 4. In this way the light filters or color screens 53 and 54 may be individually and tightly held in position without danger of their becoming broken.

However, these individual color filters 53 and 54 have inner parallel edges which are separated to the desired degree by reason of the insertion of gauge pins 58. These gauge pins can best be seen in Fig. 4 where it can be seen that the pin portion is an extended portion of a threaded screw having a large head 59. Each signal beacon is provided with a plurality of pairs of these gauge pins 58 of different sizes, any pair of which may be inserted and thereby determine the distance apart that the two color screens 53 and 54 may be located. Obviously, the gauge pins 58 are first inserted while the color filters 53 and 54 are moved apart with their respective holders 55 and 56 loosened. Following the insertion of such gauge pins, the color filters can be moved together to the limit defined by the particular gauge pins employed and then their holding nuts 61 may be tightened. It will be observed in Fig. 3 that the corners of the filter holding members 55 and 56 are enlarged or made accurate so that there is no danger of chipping or binding the filters 53 and 54 at the corners when such color filters become heated and expand during the projection of light beams.

Referring to Fig. 6 of the accompanying drawings, it will be observed that the light rays produced by the incandescent lamp 26 are focused by the elliptical reflector 27 so as to pass through the condensing lenses 30 and 39 in a manner to produce substantially parallel rays of light. These parallel rays of light pass through the red and green color screens or filters 53 and 54 illuminating them and causing light rays to be transmitted to the objective lens 40. The objective lens 40 projects the three colored light beam with a slight spread as indicated in Fig. 6. It will be apparent that the Fig. 6 is in effect a top view of the light beams, since the color filters 53 and 54 are so mounted on opposite sides as to provide a beacon signal for guiding water craft. However, by placing the filters 53 and 54 one above the other, instead of side by side, the beacon signal can be adapted for guiding aircraft, in which case the Fig. 6 might then be considered as a side view.

The movable color filter mounting 44 may be moved through a limited range along the axis of the objective lens by merely loosening lock nut 51 and rotating thumb nut 60 in the proper direction; and this range of movement includes the focal point of the objective lens 40. When the color filters are at the focal point of the objective lens 40, then the inner edges of the color filters are in effect focused at a distant point theoretically infinity. With this arrangement, the movable color filters may be so positioned that their inner edges produce in effect a focus for the most distant point which is to be the effective range of the particular signal, and in this way produce definite and distinct boundary lines between the outer colored portions of the beam and the white light central portion of the beam. In this way, the tri-color beam projected by the signal is made effective to have sharply defined areas even at its most distant range, and as a boat or an airplane approaches the signal, it can readily determine whether it is following the course defined by the white light because as soon as it moves to the right or the left it quickly and abruptly enters a differently colored zone. This sharp definition of the boundary between the different colors of the projected beam continues to be sharp and well defined up to what is conventionally termed the throat of the projected beam. However, in practice, it is customary to so locate the signal or beacons that the airplane or boat only finds it necessary to be guided along the course at points beyond the usual beam throat. In other words, the actual useful portion of the signal beam is so projected that the boundaries between the colors are well defined throughout such portion.

One distinct advantage of the present invention resides in the fact that the color filters 53 and 54 can be relatively large and the space between them can also be relatively large although a fairly narrow beam of white light is desired. This means that different adjustments can be obtained by changing the gauge pins 58 which may have practical differences in diameters. For example, the total spread of the tri-color beam may be in the order of five to ten degrees while the desired white light beam spread may be in the order of a small fraction of a degree, such as one-half, one-quarter or even one-tenth of a degree. But even with these relatively narrow white light beams, the gauge pins 58 may be made in pairs varying a few thousandths of an inch in diameters to give selected white beam widths varying in small fractions of a degree in spread. In this connection, it should be understood that for the guiding of water craft, the spread of the white beam will want to be relatively narrow so that it may guide a boat accurately along the desired course and with a minimum of lateral movement. In other words, a slow moving ship cannot determine accurately the exact course it is to follow unless it is relatively easy to find the opposite sides of such course, and for this reason it is desirable that the white light beam be relatively narrow for this particular field of use.

On the other hand, when the beacon of the present invention is employed for guiding aircraft, their relatively fast movement requires that they have more area in which to maneuver so that the course defined by the white light beam should be of somewhat greater spread than when the beacon is employed for guiding water craft.

In both fields of use, it will be apparent that the edges of the spaced color filters 53 and 54 should be straight and smooth. When the filters are made of glass this of course can be obtained by accurately grinding their inner edges. Since the gauge pins 58 are made in pairs, the two pins of each pair being identical and of a predetermined size to within a fractional part of a thousandth of an inch, it is apparent that the spaced edges of the two filters will be exactly parallel.

Thus, the spread of the white light beam can be accurately determined and made of uniform spread throughout. This accuracy of spread of the white beam is of course facilitated by the provision of precision filters and spacing pins but such means can be employed to obtain the desired results only because of the fact that the resulting projected white light beam has definite and distinct boundaries. In other words, it would be difficult to determine the spread of the central white light beam if its boundaries were indistinct; but with the structure of the present invention the projected tri-color beams have distinct boundaries and thus provide a basis upon which to select the desired adjustment of the color filter spacing to give the desired results.

When a signal beacon or range lantern has once been set and focused for a particular location, it is desirable to be able to replace that focus in the event that the incandescent lamp 26 is replaced or for some other reason the focus of the signal has been changed without giving it an actual field test. In order to accomplish this, it is proposed in accordance with the present invention to provide a refocusing attachment, a side view of which is illustrated in Fig. 7. In order to apply this attachment to the signal illustrated in Fig. 1, it is necessary to remove the holding screws which secure the hood 43 to the flange of the outer ring 41. When this hood 43 has been removed, the refocusing attachment can then have its three protruding legs 75 fitted into suitable holes in the casing 37 and secured in position by suitable nuts. These supporting legs are attached to a ring member 76 which supports a condensing lens 78 corresponding in size to the objective lens 40. Protruding from the ring 76 are three extension legs 79 which have threaded portions for attaching them to the ring 76 and also at their other ends for adjustably supporting a target member 80. This target member 80 is a circular disc as can be seen in Fig. 8 which has four small supports 81 attached thereto behind which an objective field plate 82 of white cardboard can be slipped into position until a locating hole 83 fits over the locating pins 84. When in this position, the sighting device 34 of the signal is used to mark the sighting point 85 on the template 82. The projection of the light beam from the signal is condensed by the lens 78 as shown in Fig. 9 to produce the red and green color fields RF and GF indicated in Fig. 8 by the heavy black outlines. When this signal projects its color beam to the field template 82, such field can then be traced on this template by suitable marking means, assuming of course, that the signal is properly focused at that time.

When the signal needs to be refocused, the template for this particular signal may be placed on the refocusing device which is then attached to the signal. The proper position of the device can be checked through the sighting device by aligning it until point 85 is in the proper position. The incandescent lamp 26 is then focused through the adjustable mount 29 until the projected beam again conforms to the field marked upon its associated template 82. If required the filter mount 44 can also be adjusted to give the proper width white light beam. In this way, each particular signal is provided with its own focusing template which may be applied to the refocusing attachment so that such signal can be readjusted to its original condition when its original focus has been lost due to the replacement of parts or for other reasons.

Having thus described a polychrome signal beacon and its refocusing attachment as one form of the present invention, it is to be understood, that various modifications, adaptations, and alterations may be applied to meet the requirements of practice without in any manner departing from the spirit or scope of the invention except as limited by the appended claims.

What we claim is:

1. A beacon signal for projecting multiple colored light beams from a single light source comprising, a source of light, reflector, condenser lenses, an objective lens located a fixed distance from said condenser lenses, a manually adjustable color filter mounting located between said objective lens and said condenser lenses and being movable along the axis of said objective lens adjacent its focal point, two spaced color filters attached to said mounting, said color filters being adjustably movable with respect to each other in a plane transverse of the lens axis, and replaceable spacing pins of predetermined diameter located between said color filters and contacting their edges to determine their adjusted spacing, each different pair of said replaceable pins being adapted to have different diameters for determining the desired adjusted spacing between said color filters.

2. In a polychrome projecting beacon, a source of light, a reflector, condenser lenses, an objective lens located a fixed distance away from said condensing lenses, two spaced color filters adjustably mounted between said objective lens and said condenser lenses, a directing sight attached to said beacon, and a focusing device adapted for use with said beacon and including a condensing lens and a field template having marked thereon the point of coincidence with said directing sight and the focused projected field of said beacon, whereby said light source and said color filters may be adjustably positioned to give an original projecting field as indicated on the template for that signal.

3. A beacon signal for projecting multiple colored light beams with distinct boundaries from a single light source comprising, an objective lens located a fixed distance from associated condenser lenses and a single light source, an adjustable filter mounting located between said objective lens and the associated condenser lenses and being movable along the axis of said objective lens adjacent its focal point, two spaced color filters attached to said filter mounting, a focusing device adapted for use with said beacon and including a condensing lens mounted in front of said objective lens, a holder mounted a predetermined distance beyond said condensing lens, and a field template positioned on said holder in a predetermined position and having marked thereon the proper field areas for said beacon when it is in proper focus.

4. A beacon signal for projecting multiple colored light beams from a single light source comprising, an objective lens located a fixed distance away from a light source with intervening condensing lenses, two spaced color filters adjustably mounted between said objective lens and said associated condenser lenses, said colored filters having straight smooth edges adjacent the intervening space, means for accurately determining the space between said two color filters, and a focusing device including a condensing lens and a template of the projection pattern for said beacon adapted to be mounted in front of said objective lens of said beacon.

5. A beacon for projecting a plurality of differently colored light beams from a single light source comprising, an enclosed projector structure of generally tubular form and having a covered opening in one side intermediate to its ends, one condenser lens mounted at one end of said structure, an objective lens mounted at the other end of said structure and having a focal length falling within said structure in front of said one condenser lens, a color filter mounting means located within said structure between said objective lens and said one condenser lens and being movable longitudinally along the axis of said objective lens adjacent its focal point, manually operable means for adjusting and locking said color filter mounting means in any selected position, said manually operable means being accessible through said opening, two differently colored filters located on said color filter mounting means with a space between them formed by their straight parallel edges, said space being of a predetermined width, and a light housing including an incandescent lamp, a reflector and other condenser lens, said housing being adapted to be connected to said projecting structure at its end having said one condenser lens, whereby said one and said another condenser lenses are effective to supply light rays through said color filters and between them when they are located substantially at the focal point of said objective lens to thereby cause the projection of three adjacent light beams of different colors with the boundaries between them being sharply defined.

OSCAR S. FIELD.
EDMUND W. MOORE.
FRANK S. CRAIG.

REFERENCES CITED

The following references are of record in the file of this patent:

UNITED STATES PATENTS

| Number | Name | Date |
|---|---|---|
| 1,348,855 | Fessenden | Aug. 10, 1920 |
| 1,448,922 | Fitz Gerald | Mar. 20, 1923 |
| 1,665,426 | Verdich | Apr. 10, 1928 |
| 2,168,137 | Porter | Aug. 1, 1939 |
| 2,312,294 | Worthington et al. | Feb. 23, 1943 |
| 2,344,263 | Perkins | Mar. 14, 1944 |
| 2,386,268 | Roper | Oct. 9, 1945 |
| 2,431,240 | Gausch | Nov. 18, 1947 |
| 2,441,877 | Flett | May 18, 1948 |
| 2,458,414 | Penton | Jan. 4, 1949 |
| 2,498,294 | Pennow et al. | Feb. 21, 1950 |

FOREIGN PATENTS

| Number | Country | Date |
|---|---|---|
| 20,941 | Great Britain | Oct. 23, 1897 |